July 28, 1964     H. A. RIDEOUT     3,142,496
ACCOUNTING SYSTEM

Filed April 29, 1963     2 Sheets-Sheet 1

INVENTOR.

Hardy A. Rideout

July 28, 1964         H. A. RIDEOUT         3,142,496
                      ACCOUNTING SYSTEM
Filed April 29, 1963                    2 Sheets-Sheet 2
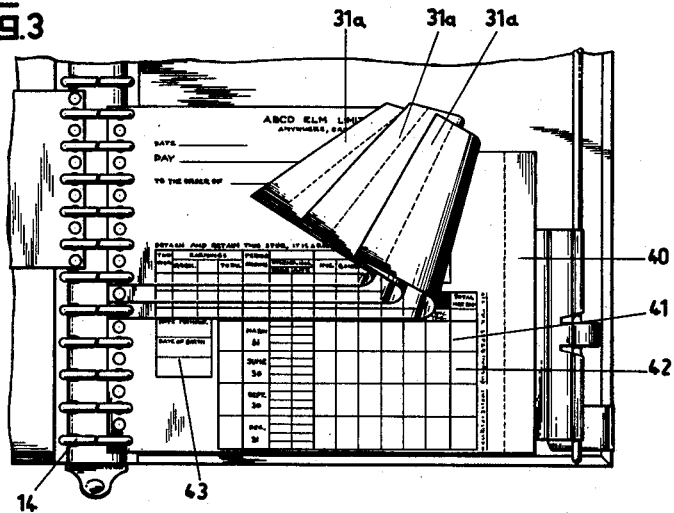
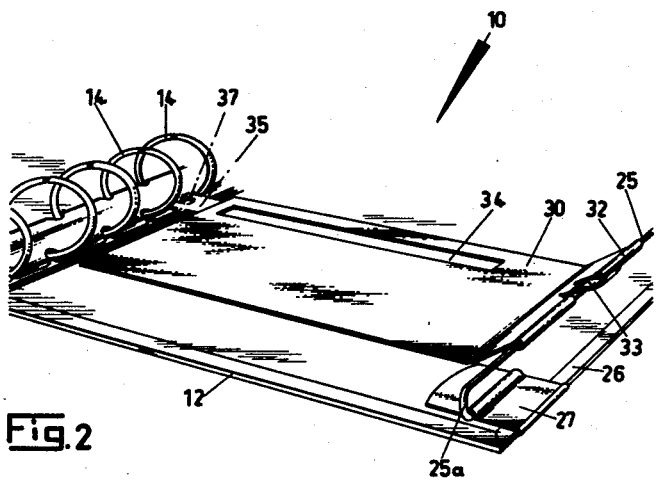
INVENTOR.
Hardy A. Rideout

United States Patent Office 3,142,496
Patented July 28, 1964

3,142,496
ACCOUNTING SYSTEM
Hardy A. Rideout, 26 Burwood Road, Islington,
Ontario, Canada
Filed Apr. 29, 1963, Ser. No. 276,512
4 Claims. (Cl. 282—8)

This invention relates to improvements in accounting systems generally and, more particularly to improvements in hand written payroll systems.

Conventional systems generally known as writing or peg board systems require that the individual pay documents be handled at time of preparation of the payroll. In a normal payroll operation these forms are as follows:

(1) The pay cheque or statement of earnings and deductions.
(2) The earnings record.
(3) The payroll summary or journal.

In this type of writing board each pay cheque is separately placed thereon in order to be processed, although a number of earnings records can be bulk loaded on the board and the process of making out the cheque or the statement of earnings and deductions consists of placing the cheque or statement of earnings and deductions on the board and copying the required figures onto the cheque. The cheque and the relevant earnings record are thereafter removed from the board, a new cheque placed on the board and the required information copied onto the cheque from the next earnings record, again both the cheque and the earnings record being removed at the completion of this operation. It should be noted that the information copied onto the cheque or statement of earnings and deductions is usually transferred by means of conventional carbon paper or the like to the payroll summary which is located on the board under the pay cheque or statement of earnings and deductions. This necessitates a fresh portion of the payroll summary being indexed each time a new cheque is placed on the board.

The disadvantages of these prior systems are:

(1) The employee's name and number and any other relevant information must be entered on both the cheque and the payroll summary and furthermore a note of the cheque number must be made on the earnings and deductions stub and the payroll summary.

(2) There is constant handling of the three relevant forms.

(3) There is a definite limit to the number of earnings records which can be bulk loaded onto the board, which means that if the number of employees exceeds this limit the person making out the pay accounts must stop and re-load the board.

(4) Departmental payroll costs can be made up only after the whole payroll has been made up.

(5) The constant information record such as hourly rates of pay, standard deductions and the like is often located in a position which is awkward for copying and thus increases the possibilities of errors in transcribing.

(6) The annual income tax record form showing employee's gross pay, income tax deducted and other relevant information must be made up separately and this also is a time consuming process.

(7) Under certain circumstances, with some types of earnings records, statements such as those for unemployment insurance payments are removed from the earnings record for forwarding to the Unemployment Insurance Commission, and should this information be subsequently required it can only be retrieved from the payroll summary which is also a time consuming process.

It is, therefore, a primary object of my invention to provide a payroll accounting system which, at the time of making up the payroll, requires the relevant information be copied, once only, that is, onto the cheque or statement of earnings and deductions and which does not require any further writing of cheque numbers.

Another object of the invention is to provide a payroll accounting system wherein only the cheque or statement is handled at the time of making up the payroll.

A further object is to provide a payroll accounting system wherein the binder can be preloaded with all the documents necessary to making up the payroll and said documents are both easy and convenient to handle.

A further object of the invention is to provide payroll accounting system wherein departmental payroll costs can be summarized as that particular department is completed without having to wait until the payroll is completed before summarizing departmental costs.

Another important object of my invention is to provide a payroll accounting system wherein the constant information record is located in such a position that the information thereon is juxtaposed the cheque or statement and furthermore, a register backing plate is provided to ensure the correct line of figures is copied.

Yet another object of the invention is to provide a payroll accounting system wherein the employers' earnings records are instantly available and totalled quarterly, and the annual income tax statement, for instance, is a by product of totalling the earnings record at the year end or at the termination of service of any employee. Thus a separate copying of relevant information is not required for the income tax statement. Still another object of the invention is to provide a payroll accounting system in which a permanent record of such statements as the unemployment insurance payments is always readily available.

A further object of the invention is to provide a payroll accounting system in which the cheques or statements can be overlapped or shingled, and even though self carboned, cannot be overprinted due to the use of the register backing plate.

Another object of the invention is to provide a payroll accounting system which will permit rapid handling of the cheques or statements when making up the payroll.

Still a further object of the invention is to provide a payroll accounting system which, by permitting the binder to be fully bulk loaded in advance of payroll preparation and by also permitting certain portions of the operation to be carried out after the payroll has been made up, spreads the work load more evenly over the week and generally promotes greater office efficiency.

Another object of the invention is to provide a payroll accounting system which reduces the total forms handling required.

These and other objects and features will become apparent when the following description is read in conjunction with drawings, in which:

FIG. 2 is an enlarged, fractional perspective view of the binder shown in FIG. 1, showing particularly details of the register backing plate.

FIG. 3 is a fractional perspective view of a second binder utilized to file the copies of the cheques or statements of earnings and deductions on top of their appropriate earnings record.

Figure 1:
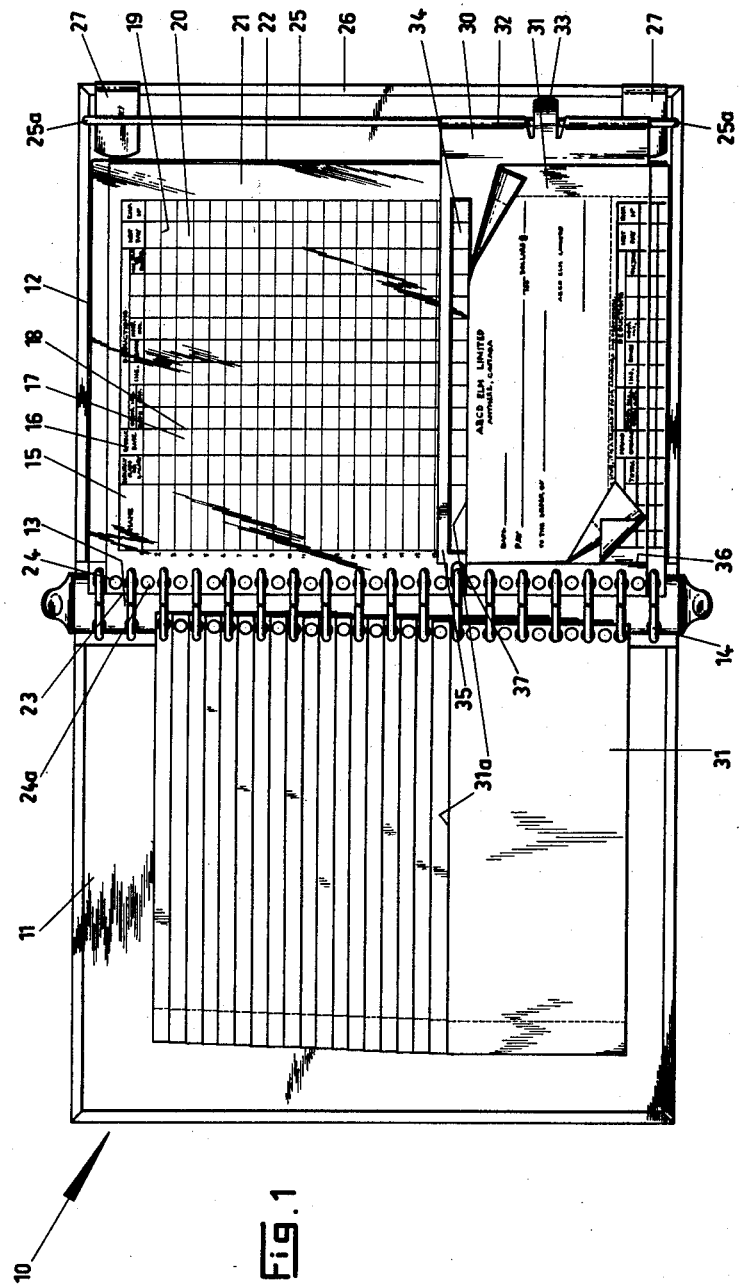
FIG. 1 is a perspective view of a binder embodying the present invention showing the general layout of the constant information sheet, the method of "shingling" the cheques and the selection thereof.

Referring to FIG. 1, a binder 10 is of a substantially conventional multi-ring type, having a front cover 11, a back cover 12 and a centre spine 13 bearing a plurality of equally spaced rings 14. Rings 14 are of the conventional split ring type.

A constant information sheet 15 is adapted to lay on the inner surface of rear cover 12, the top of the sheet carrying a number of appropriate headings 16 denoting such constant information as employee's name, hourly rate or salary, taxes payable, bond deductions and the like. Each heading 16 denotes a vertical column 17 delineated by vertical lines 18. Sheet 15 is subdivided horizontally by a plurality of equi-spaced, parallel lines 19 to provide a horizontal column 20 for each employee on the payroll.

In a preferred embodiment, sheet 15 is contained in a clear plastic folder 21, the outer edge 22 of which is the folded edge and the open inner edge 23 being perforated in a vertical line of holes 24 registerable with rings 14.

From the drawing it will be seen that the row of holes 24 in the upper sheet of folder 21 are slot punched and in this way, folder 21 is securely located on rings 14 by the holes 24 in the lower sheet of folder 21 and are also located by holes 24a, the latter, however, permitting the upper sheet of folder 21 to be lifted when it is required to make any necessary changes to the information on sheet 15.

Referring also to FIG. 2, a vertical guide rod 25 is securely attached to rear cover 12 adjacent the outer edge 26 thereof. Rod 25 is held spaced apart from the inner surface of cover 12, preferably by having each end 25a bent in a U configuration and thereafter retained on cover 12 by spring clips 27—27 to which the ends 25a are attached.

It will be noted that rod 25 is located outwardly of outer edge 22 of folder 21.

A register backing plate 30 is of thin, rigid sheet material such as aluminum of generally rectangular conformation and in breadth is adapted to extend across rear cover 12 between rings 14 and rod 25, its vertical height being determined by the size of the cheques 31 utilized by the company.

The outer edge 32 of backing plate 30 is suitably rolled or the like to maintain it upon rod 25 in close, sliding relationship therewith. A tab 33 is provided adjacent edge 32 to facilitate the handling of plate 30.

A narrow slot 34 is formed transversely in plate 30, adjacent the upper edge thereof. Slot 34 is of substantially the same width as a horizontal column 20 of sheet 15, while in length, slot 34 is adapted to coincide with the width of sheet 15.

Thus, upon plate 30 being located over sheet 15, slot 34 may be registered with any selected horizontal column 20 and the information in that particular column 20 is thereby framed.

A horizontally slotted indexing tab 35 may be optionally provided at the inner edge 36 of plate 30, the slot 37 in tab 35 being of sufficient width to permit it to register closely with any selected ring 14, as illustrated in FIG. 1, while tab 35 is equal in width to the space between adjacent rings 14, so that, as shown in phantom in FIG. 2, it may register closely between any pair of rings 14.

The amount of vertical movement between a first position of plate 30 wherein slot 37 is located on a ring 14 and a second position wherein tab 35 is located between that particular ring 14 and its adjacent ring 14 is equal to the width of one horizontal column 20.

Thus plate 30 may be moved progressively up binder 10, each successive move, being positively indexed as described, plate 30 also being swung through a small arc about its outer edge 32 by means of tab 33 in order to permit this vertical movement.

The deletion of tab 35 permits plate 30 to be slid up guide rod 25 without the arcuate movement as described. A plurality of cheques 31 or statements of earnings and deductions, depending on whether payment is by cheque or cash, are shingled, face down, on the front cover 11 of binder 10.

Cheques 31 are multi-part, and in this particular embodiment are three part, and are perforated at their inner edges to permit them to be assembled on rings 14. The spacing of their perforations enable them to be overlapped a distance equal to the width of one horizontal column 20.

Thus, as shown in FIG. 1, the plate 30 is located in its lower position and the first cheque 31 is brought over from front cover 11 to lie face up on plate 30. The upper edge 31a of cheque 31 is adapted to substantially coincide with the lower edge defining slot 34 in plate 30.

All the required constant information on one employee is visible through slot 34 and may be copied onto cheque 31, the framing of this information, as described, ensuring that only the relevant information is readily available for copying and errors due to misreading are substantially eliminated.

By highlighting the information in this way and by the location of it immediately above the cheque, the copying is greatly facilitated and a faster operation results.

Subsequent cheques 31 are brought across successively for processing, plate 30 either being moved arcuately upwardly to permit it to lie on the previously processed cheque or it may be slid up on rod 25 and then back again to lie upon the previous cheque. In this manner, plate 30 is always interposed between the uppermost cheque 31 and the previously selected cheque, thereby providing a rigid backing to facilitate writing and preventing any overprinting between cheques.

Referring to FIG. 3, an earings record sheet 40 is illustrated having a plurality of vertical columns 41 formed thereon and being transversely divided to provide a plurality of horizontal columns 42.

Sheet 40 is perforated at its inner edge for location on rings 14 and may either be inserted in binder 10 between sheet 15 and rear cover 12 as illustrated or preferably kept in a separate similar binder.

From the three parts of cheque 31, the uppermost part is issued to the employee, the duplicate is usually filed for bank reconciliation purposes while the bottom copy 31a is filed by the company to be utilized in preparing the earnings record sheet 40.

Sheet 40 is an individual record and the relevant copies 31a of the cheques are filed on rings 14 above the top horizontal column 42 of sheet 40, subsequent copies 31a being shingled thereover so that at the end of, say, a quarter year, all the appropriate copies 31a are so located that the figures thereon are arranged in vertical columns in alignment with vertical columns 41 on sheet 40.

In this case, horizontal columns 42 are arranged to carry quarterly totals, the calculation of which is rendered extremely easy by the arrangement, as described, of copies 31a.

An employee information block 43 is also included on sheet 40, and at the top of sheet 40 all the necessary annual information for income tax purposes are transcribed, thus eliminating the necessity for preparing separate income tax forms.

It will be obvious to one skilled in the art that the accounting system and the apparatus therefor herein described, although mainly directed toward pay accounting, may be equally well adapted to other fields of accounting such as accounts payable and receivable.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. An accounting system including a binder having a front cover, a back cover, a centre spine and a plurality of releasable rings extending upwardly therefrom; a constant information sheet having a plurality of intersecting vertical and horizontal lines thereon to form vertical and horizontal columns; a transparent folder encasing said sheet; the inner vertical edges of said folder being perforated for attachment to said rings; said binder being opened flat in use; said folder normally maintaining said sheet face up on the upper surface of said back cover; a plurality of multi-part cheques shingled face down on the upper surface of said front cover, overlapping a distance equal to the height of one of said horizontal columns; the inner edges of said cheques being perforated for attachment to said rings; a vertical guide bar; means attaching said guide bar to said back cover adjacent the outer vertical edge thereof and spaced upwardly therefrom; a rectangular register backing plate substantially equal in size to one of said cheques; said plate extending transversely across said sheet; an outer vertical edge of said plate retained in close, slidable relation on said guide bar; an inner vertical edge of said plate located in close relation to said rings; said plate having an elongate rectangular slot formed therein adjacent to and parallel with the upper edge thereof, said slot being the size of and registerable with any one of said horizontal columns; said cheques being moveable about said rings to lie on said plate successively; and the upper horizontal edge of each of said cheques registering with the bottom edge of said slot successively upon said slot registering with said horizontal columns successively.

2. An accounting system as defined in claim 1 including tab means attached to said plate adjacent to said outer vertical edge thereof.

3. An accounting system as defined in claim 1 including first tab means attached to said plate adjacent to said outer vertical edge thereof and second tab means extending from said inner vertical edge thereof; and said second tab means being registerable between said rings.

4. An accounting system as defined in claim 1 including first tab means attached to said plate adjacent to said outer vertical edge thereof and second tab means extending from said inner vertical edge thereof; said second tab means being registerable between said rings; and said tab being slotted, said slot being registerable with any one of said rings.

References Cited in the file of this patent
UNITED STATES PATENTS

| | | |
|---|---|---|
| 2,344,453 | Payne | Mar. 14, 1944 |
| 2,597,579 | Gleaves | May 20, 1952 |
| 2,734,756 | Selinker | Feb. 14, 1956 |
| 2,836,433 | Dolan | May 27, 1958 |
| 2,976,062 | Brechner | Mar. 21, 1961 |